US008256705B2

(12) United States Patent
Smith (10) Patent No.: US 8,256,705 B2
(45) Date of Patent: Sep. 4, 2012

(54) TORQUE PRODUCTION VEHICLE AND METHOD

(75) Inventor: Timothy D. Smith, Vienna, VA (US)

(73) Assignee: Raytheon Company, Waltham, MA (US)

( * ) Notice: Subject to any disclaimer, the term of this patent is extended or adjusted under 35 U.S.C. 154(b) by 445 days.

(21) Appl. No.: 12/612,227

(22) Filed: Nov. 4, 2009

(65) Prior Publication Data

US 2011/0101155 A1    May 5, 2011

(51) Int. Cl.
*B64C 15/00*    (2006.01)
(52) U.S. Cl. ...................... 244/12.1; 244/12.2; 244/23 D
(58) Field of Classification Search .................. 244/12.1, 244/12.2, 12.4, 12.5, 12.6, 23 C, 23 D, 73 C, 244/82, 76 J; 415/90, 1, 58.2, 58.6
See application file for complete search history.

(56) References Cited

U.S. PATENT DOCUMENTS

| | | | |
|---|---|---|---|
| 2,835,073 A | | 5/1958 | Dame |
| 3,456,902 A | | 7/1969 | Visconti |
| 4,941,628 A | | 7/1990 | Sakamoto et al. |
| 4,948,068 A | | 8/1990 | VanHorn |
| 5,178,344 A | | 1/1993 | Dlouhy |
| 5,419,513 A | * | 5/1995 | Flemming et al. ........... 244/12.2 |
| 5,803,199 A | * | 9/1998 | Walter ........................... 180/120 |
| 5,890,441 A | | 4/1999 | Swinson et al. |
| 6,050,520 A | * | 4/2000 | Kirla ........................... 244/23 A |
| 6,666,404 B1 | | 12/2003 | Wingert et al. |
| 6,845,942 B2 | | 1/2005 | Paul |
| 6,969,027 B2 | | 11/2005 | Ishiba |
| 7,147,183 B1 | * | 12/2006 | Carr et al. ........................... 244/12.2 |
| 7,201,346 B2 | | 4/2007 | Hansen |
| 7,275,712 B2 | | 10/2007 | Yoeli |
| 2004/0094662 A1 | | 5/2004 | Sanders, Jr. et al. |

FOREIGN PATENT DOCUMENTS

WO    WO 2009/024101    2/2009

OTHER PUBLICATIONS

FAS Intelligence Resource Program, RQ-4A Global Hawk (Tier II+HAE UAV), http://www.fas.orc/irp/program/collect/global_hawk.htm, last visited Nov. 2, 2009, pp. 1-5.
Zuk, B., The Avrocar Story, http://www.avrocar.com/avrocarstory.html, last visited Nov. 2, 2009, pp. 1-3.
Notification of Transmittal of the International Search Report and the Written Opinion of the International Searching Authority, or the Declaration, PCT/US2010/051948, date of mailing Aug. 22, 2011, 5 pages.
Written Opinion of the International Searching Authority, PCT/US2010/051948, date of mailing Aug. 22, 2011, 6 pages.
Jameson et al., "SAMARAI Nano Air Vehicle—A Revolution in Flight", AUVSI Unmanned Systems North America Conference Proceedings, Aug. 2007, XP000002656731, Washington D.C., Retrieved from the internet:, 15 pages.

* cited by examiner

*Primary Examiner* — Joshua J Michener
*Assistant Examiner* — Medhat Badawi
(74) *Attorney, Agent, or Firm* — Daly, Crowley, Mofford & Durkee, LLP (57) ABSTRACT

A torque production vehicle includes a plenum body having a wall with a central port and a radial port formed within the wall, an impeller disposed within the plenum body to move air through the central port, an engine coupled to the impeller to rotate the impeller about an axis, at least one arm coupled to the plenum body, and a plurality of foils disposed in the radial port to direct air about the plenum body to provide a torque force about the plenum body.

41 Claims, 13 Drawing Sheets

TORQUE PRODUCTION VEHICLE AND METHOD

BACKGROUND

As is known in the art, organizations such as the military, the Department of Homeland Security, and other agencies may utilize unmanned aerial vehicles (UAV) for border security, fish and widelife protection, underwater and surface protection, maritime search and rescue, weather sensing application, etc. In a military context, Intelligence, Surveillance, and Reconnaissance (ISR) operations may use UAV to link several battlefield functions together and to assist in the collection of battlefield information.

Many existing UAV, although quite useful, have certain design and operational disadvantages. For example, some UAV such as air balloons have long flight endurance, but are difficult to rapidly deploy and may be relatively large and slow-moving, making them relatively easy targets for enemy forces. Other UAV can be rapidly deployed and are relatively small, but their flight endurance is extremely limited. Still other UAV offer long flight endurance, large payload capacity, and high altitude capability, but are relatively expensive and difficult to operate and maintain. For example, the Global Hawk, developed by the Northrop Grumman, Corp. of Los Angeles, Calif., offers 36 hours of in-flight endurance, payloads of nearly 2,000 lbs., and a maximum altitude of 65,000 feet. However, the Global Hawk is known to be expensive to manufacture and maintain and requires complex operational support.

SUMMARY

In general overview, the systems, techniques, and concepts described herein are directed to an unmanned aerial vehicle capable of providing highly-efficient controllable torque to provide lift and directional control. The vehicle includes a plenum body which in some embodiments may include a downward facing annular slot formed between disc-shaped portions. Airflow directed through foils disposed within the annular slot generates a torque force about the rotating vehicle. The torque force can provide vehicle lift and eliminate or reduce downwash drag on the plenum body. In this way, a highly-efficient aerodynamic vehicle is provided that can be relatively easy and inexpensive to manufacture, operate, and maintain. Furthermore, the vehicle is highly autonomous, small-sized, quiet, and possess relatively long in-flight endurance.

In further embodiments, the vehicle includes a wide plenum body to provide a floating platform. The wide plenum body may further include solar cells on an upward facing surface capable of charging energy cells to power the vehicle. In still further embodiments, a conical-shaped bottom of the vehicle can facilitate take-off and landing from a body of water and can house sensors. Such sensors can include dipping underwater sonar sensors.

In other embodiments, the plenum body includes a flexible collapsible/expandable material that enables the vehicle to be collapsed for storage/transport and expanded for field deployment and operation. In an exemplary military context, technicians can prepare the vehicle for operation by collapsing the vehicle and storing it in a storage compartment of, for example, a transport vehicle, for travel to a mission site. At the mission site, field personnel can deploy the vehicle by releasing the vehicle from the storage compartment causing the vehicle to expand, for example, by automatically inflating the plenum body with air.

In one aspect, a vehicle includes a plenum body having a wall with a central port and a radial port formed within the wall, an impeller disposed within the plenum body to move air through the central port, an engine coupled to the impeller to rotate the impeller about an axis, at least one arm coupled to the plenum body, and a plurality of foils disposed in the radial port to direct air about the plenum body to provide a torque force about the plenum body.

In further embodiments, the vehicle includes one or more of the following features: the plenum body includes a base portion defined by a conical-shaped cross-sectional area positioned toward a bottom end of the plenum body; the plenum body is defined by a vertical extent and a horizontal extent longer than the vertical extent and the conical-shaped cross-sectional area is symmetric about a central radial axis; the plenum body rotates about a central axis and the base portion of the plenum body is longitudinally coincident with the central axis; the plenum body further includes an upper portion vertically opposing the base portion, the radial port is formed between a lower radial extent of the upper portion and an upper radial extent of the base portion; the radial port forms an annular slot between the base portion and the upper portion; the annular slot is formed along the entire area around the plenum body; the inner surface of the plenum body wall is smooth to substantially reduce a coefficient of friction of air moving along the inner surface of the plenum body; the plenum body is comprised of a flexible material; the flexible material is expandable and collapsible; the impeller is a centrifugal impeller; the impeller is an axial impeller; the impeller is a mixed flow impeller; the arm is a lift arm configured to provide at least one of: vertical movement, pitch movement, roll movement, and horizontal movement of the vehicle; the arm is coupled distally to the plenum body; the arm is a plurality of arms; the arms are evenly spaced about the plenum body; the vehicle further includes a shaft to couple the impeller and the engine, and; the vehicle further includes a controller.

In another aspect, a method of torque production includes providing a vehicle including a plenum body having a wall with a central port and a radial port formed within the wall, an impeller disposed within the plenum body to move air through the central port, an engine coupled to the impeller to rotate the impeller about an axis, at least one arm coupled to the plenum body, and a plurality of foils disposed in the radial port to direct air about the plenum body to provide a torque force about the plenum body.

BRIEF DESCRIPTION OF THE DRAWINGS

The foregoing features of this invention, as well as the invention itself, may be more fully understood from the following description of the drawings in which.

DETAILED DESCRIPTION

Before departing on a detailed description of embodiments of the inventive concepts, techniques, and systems described herein, it may be helpful to review operation of rotorcraft vehicles. Rotorcraft vehicles are spun by mechanical torque forces transmitted by a shaft that connects a rotorcraft fuselage with an engine hub. In manned rotorcraft vehicles, counter-torque forces must be provided to equalize torque forces and to stabilize the vehicle. Dual-rotor helicopters use counter-rotating rotors to counteract the main rotor torque. In particular, these vehicles may use tail rotors to provide an opposing counter-torque to the main rotor torque at drive speed.

NOTAR® (NO TAil Rotor) systems can provide counter-torque without tail rotors. These systems exit low-pressure air through tail boom portals to create a boundary layer flow of air along the tail boom. The boundary layer flow of air reorients airflow direction around the tail boom to generate a thrust (i.e. a counter-torque) opposite the main rotor torque force. This counter-torque is generated by the Coandă effect, which refers to a tendency of a fluid jet (the boundary layer of air flow) to stay attached (i.e. to wrap around) an adjacent surface (the tail boom surface).

All-rotating unmanned vehicles, including monocopters, typically consist of a single rotor blade counter-balanced by thrust-producing devices mounted opposite to the blade. The devices may be mounted some distance from the center of vehicle rotation to produce a tangential thrust relative to the axis of vehicle rotation. Other rotorcraft vehicles use tip-jets to generate rotor torque without requiring a counter-torque producer in the main vehicle body, however one particular disadvantage of tip-jets is the noise they generate a near-supersonic levels.

Another type of non-rotating, manned hovering vehicle is the AVROCAR, produced by the United States Army in the 1950's, which is flying saucer shaped vehicle that uses fans and annular jets to control air flow. The fans push out the air through the annular jets which, due to the Coandă effect, causes the air to wrap underneath the vehicle to provide lift. However, the AVROCAR does not generate counter-torque forces. The U.S. Army discontinued development of AVROCAR in part because of difficulties in controlling the vehicle.

Figure 1A:
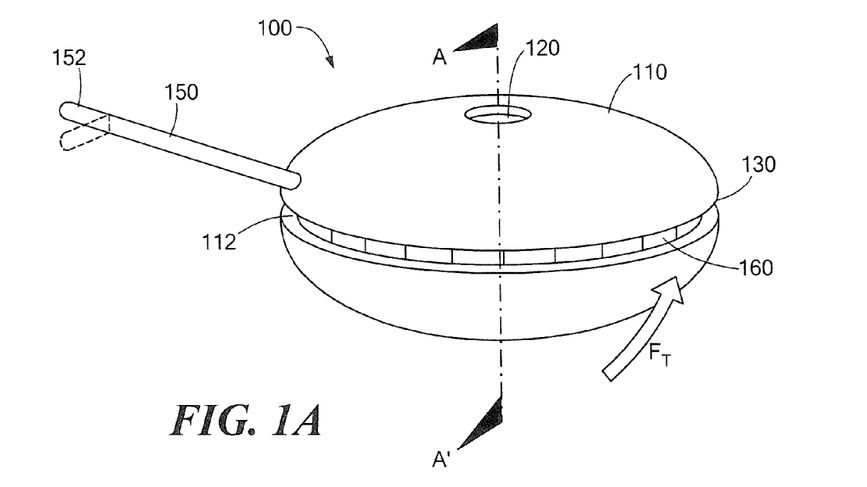
FIG. 1A is a pictorial representation of a torque production vehicle embodiment.
Figure 1B:
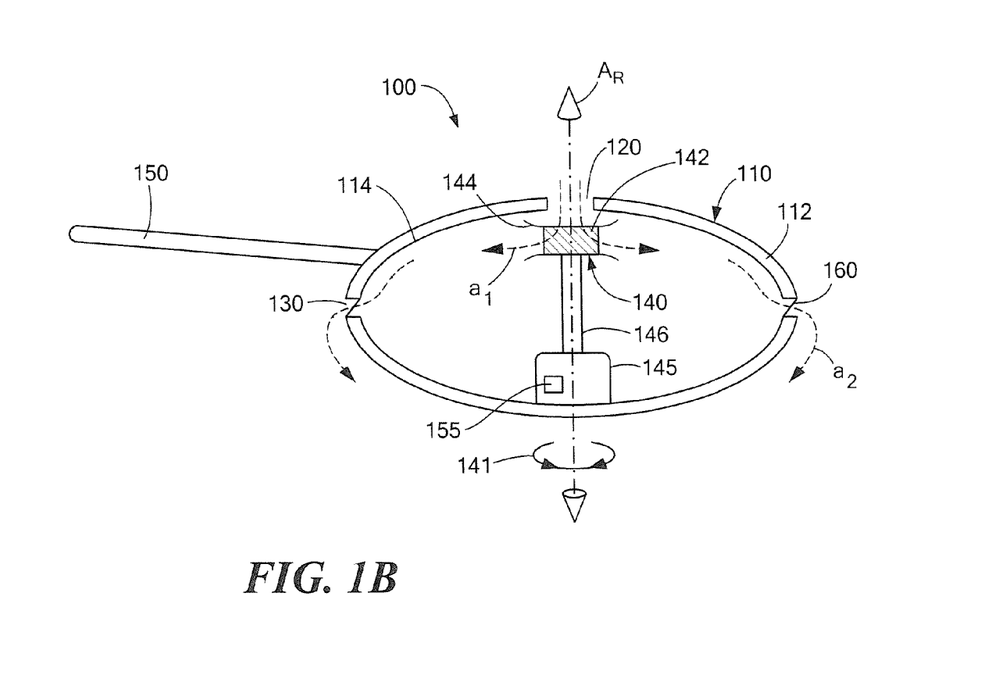
FIG. 1B is a pictorial representation of a cross-sectional side view of the torque production vehicle embodiment of FIG. 1A at reference line AA'.

Referring now to FIGS. 1A and 1B, in one aspect, the inventive concepts, systems, and techniques are directed to a vehicle 100, an embodiment of which is shown in perspective view in FIG. 1A and in cross-sectional side view in FIG. 1B through reference line AA' of FIG. 1A. The vehicle 100 includes a plenum body 110 having a wall 112 with a central port 120 and a radial port 130 formed within the wall 112. The vehicle 100 includes an impeller 140 disposed within the plenum body 110 to move air (generally denoted by the dashed line marked "$a_1$") through the central port 120. An engine 145 coupled to the impeller 140 rotates (denoted by reference numeral 141) the impeller 140 about an axis $A_R$.

In a further embodiment, the plenum body 110 is axially symmetric. In the same or different embodiment, the vehicle 100 is an all-rotating vehicle that rotates about an axis $A_R$ substantially coincident with the radial center of the plenum body 110.

The plenum body 110 may be constructed of a variety of materials selected for a particular application and/or environment of the vehicle 100. For example, the plenum body 110 may include a hard-shelled composite material capable of deployment in some airborne environments. In other embodiments, the plenum body 110 may comprise a flexible material capable of rapid inflation and/or deflation, as will be described herein below. In the same or different embodiment, the plenum body 110 may comprise a water-tight material capable of deployment in water environments and, more particularly, capable of floating about a body of water to maintain the vehicle 100 proximate to a surface of the body of water, as will also be described herein below.

The vehicle 100 also includes an arm 150 coupled to the plenum body 110 and foils (generally denoted by reference numeral 160) disposed in the radial port 130 to direct air (generally denoted by the dashed line marked "$a_2$") about the plenum body 110 to provide a torque force $F_T$ about the plenum body 110. In particular, the air $a_2$ tends to wrap around the outer surface of the plenum body 110. Some, all, or none of the air flow/wrap around tendencies may be characterized by a behavior of aerodynamic airflow about surfaces known as the Coandă effect.

In a further embodiment, the inner surface 114 of the plenum body wall 112 is smooth to substantially reduce a coefficient of friction of air moving along the inner surface 114 of the plenum body wall 112. Advantageously, this can substantially reduce an amount of drag about the plenum body wall 112, which aides in optimizing vehicle aerodynamic performance. Furthermore, the smooth inner surface 114 minimizes drag on air moving from the impeller 140 to the radial port 130.

In some embodiments, the inner surface 114 is configured to eliminate or minimize internal structures proximate to the inner surface 114 such as struts and beams, thereby reducing any drag that may otherwise be produced by these structures. In still other embodiments, the inner surface 114 includes such internal structures configured to be aerodynamically smooth.

In some embodiments, the impeller 140 is a centrifugal impeller. A centrifugal impeller is a rotating body of foils driven by an engine. The foils draw air into the impeller and accelerate the air outward about impeller rotation.

In the centrifugal impeller embodiment, the foils (generally denoted by reference numeral 142) draw in air $a_1$ from outside of the plenum body 110 through the central port 120 and force the air outward in a radial direction into the plenum body 110. In this way, the impeller 130 can be said to transfer the energy of the rotating foils to the accelerated air which is limited by the plenum body wall 112 and becomes pressurized.

The accelerated air generally spins outward which can produce an internal torque force. In further embodiments, the impeller 140 includes foil 144 coupled to the top and/or to the bottom of the impeller 140. In some embodiments, the foil 144 reduces the internal torque force by producing a drag force to slow down the spinning air mass.

In different embodiments, the impeller 140 is an axial impeller. An axial impeller is a rotating body of foils which are aligned in a plane orthogonal to an axis of impeller rotation about a central shaft. The rotating foils transfer rotational motion into thrusts of air accelerated behind the foils parallel to the axis of rotation.

In the axial impeller embodiment, the foils draw in air from outside the plenum body 110 through the central port 120, similar to the centrifugal impeller embodiment; however, the air is accelerated in an axial direction. In a further embodiment, the axial impeller includes a number of stator foils positioned behind the rotating foils and defined by a cone-shaped profile to redirect the air in a radial direction.

In still a further embodiment, the impeller is a mixed-flow fan which includes aspects of the centrifugal and propeller impeller embodiments described above.

In another embodiment, the arm 150 is coupled distally to the plenum body 110 relative to the impeller axis of rotation $A_R$.

In a further embodiment, the vehicle 100 includes a controller 155 configured to control movement of the vehicle 100. For example, the controller 155 may be configured to increase and/or decrease engine power to the impeller 140. As will become further apparent from the description herein below, this ultimately affects the generated torque force $F_T$ about the plenum body to control lift and direction. Still further, the controller may operate one or more foils coupled to the arm 150, for example, to control lateral movement of the vehicle 100.

In further embodiments, the controller 155 may receive remote control communications such as those transmitted by a remote control device operated by a human operator at a command station or in the field. The remote control communications are configured to operate various components of the vehicle 100 to control vehicle lift and/or lateral movement. For example, foils on the arm 152 may be pivoted during revolutions of the arm to control lift, pitch, roll, and lateral movement.

In a further embodiment, the vehicle 100 includes a shaft 146 to couple the engine 145 with the impeller 140. In some embodiments, the engine 145 is coupled to the plenum body 110. As by way of a non-limiting example and as shown in the vehicle embodiment 100 of FIG. 1B, the engine 145 may be coupled to a bottom portion of the plenum body 110. The engine 145 rotates the shaft 146 which rotates the impeller 140 independently of the plenum body 110.

Figure 2A:
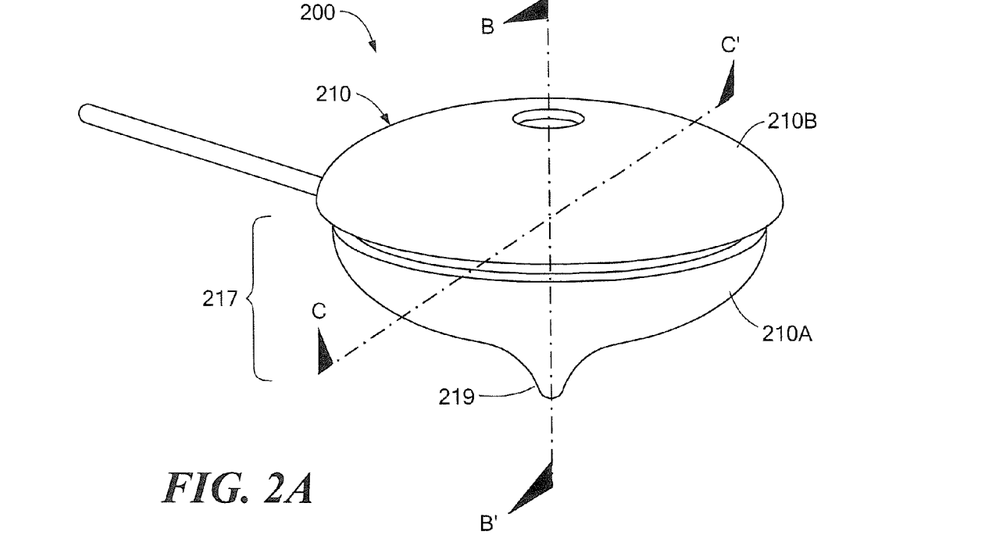
FIG. 2A is a pictorial representation of another torque production vehicle embodiment defined by a cone-shaped cross-sectional area and symmetric about a central axis.
Figure 2B:
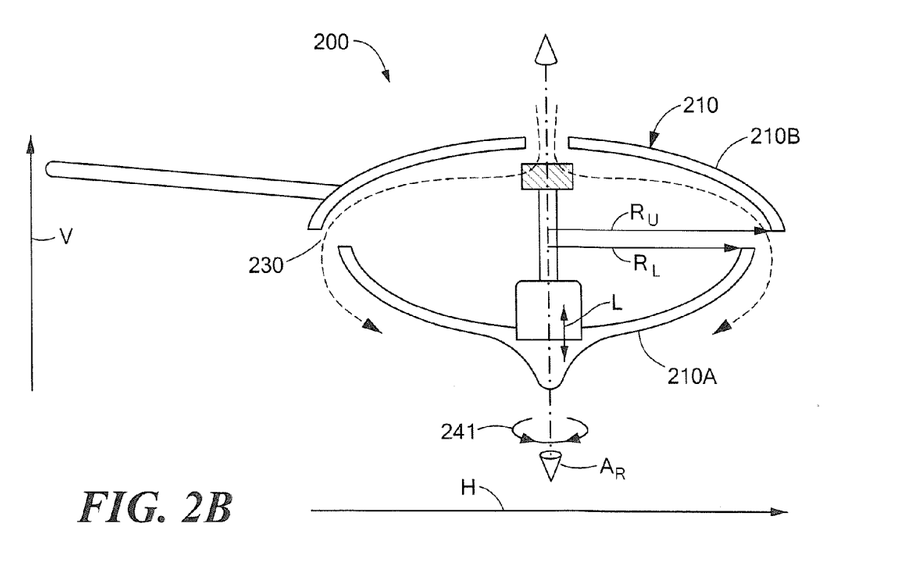
FIG. 2B is a pictorial representation of a cross-sectional side view of the torque production vehicle embodiment of FIG. 2A at reference line BB'.

Referring now to FIGS. 2A and 2b, in another embodiment, a vehicle 200, shown in perspective view in FIG. 2A and in cross-sectional side view in FIG. 2B through reference line BB' of FIG. 2A, includes a plenum body 210 including a base portion 210A defined by a conical-shaped cross-sectional area 217. As can be seen in FIG. 2A, the conical-shaped cross-sectional area 217 is directed toward a bottom end 219 of the plenum body 210. In a further embodiment, the plenum body 210 is defined by a vertical extent V, a horizontal extent H longer than the vertical extent V, and a symmetric cross-sectional area. In such a configuration, the longer horizontal extent and symmetry of the plenum body can provide stability and enable the vehicle to float about a body of water.

In a further embodiment, the plenum body 210 rotates 241 about a central axis $A_R$ and the base portion 210A of the plenum body 210 is longitudinally coincident L with central axis $A_R$.

Figure 2C:
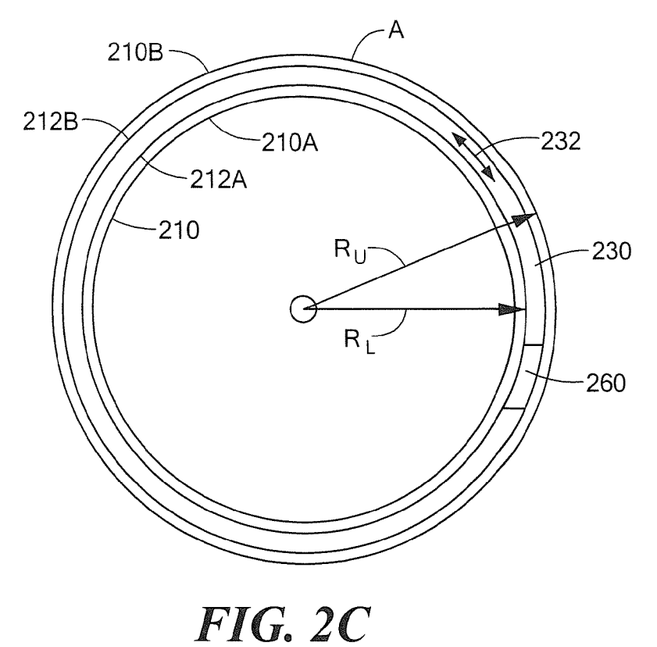
FIG. 2C is a pictorial representation of an axial top view of the torque production vehicle embodiment of FIG. 2A at reference line CC' along a central axis.

Referring again to FIGS. 2A and 2B, and now to FIG. 2C showing a cross-sectional top view of the vehicle 200 at reference line CC' of FIG. 2A, in a further embodiment, the plenum body 210 includes an upper portion 210B vertically opposing the base portion 210A. Radial port 230 is formed between a lower radial extent $R_U$ of the upper portion 210B and an upper radial extent $R_L$ of the base portion 210A. As can be seen in FIGS. 2B and 2C, the radius $R_L$ of base portion 210A is shorter than the radius $R_U$ of the upper portion 210B.

In still a further embodiment, the radial port 230 forms an annular slot 232 along at least a portion of the area A around the plenum body 210. In particular, the annular slot 232 is formed between the outer surface of the base portion wall 212A and the inner surface of the upper portion wall 212B. In still a further embodiment, the annular slot 232 is formed along the entire area A around the plenum body 210.

Figure 2D:
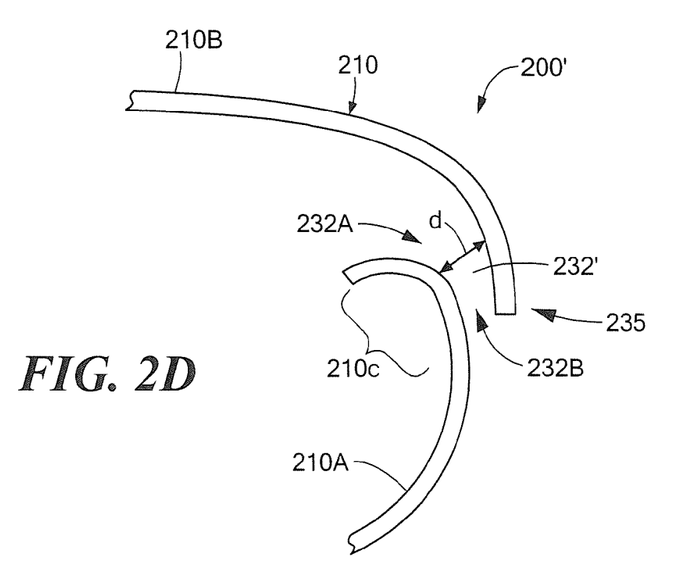
FIG. 2D is a pictorial representation of an expanded cross-sectional side view of an annular slot area configuration of the torque production vehicle embodiment of FIG. 2A.

Referring now to FIG. 2D showing an expanded cross-sectional side view of an annular slot area 235 of a further vehicle embodiment 200', and in which like elements of FIGS. 2A, 2B, and 2C are shown with like reference designations, a diameter d of the annular slot 232' tapers from an inner portion 232A of the annular slot 232' to an outer portion 232B of the annular slot 232'. The plenum body base portion 210A includes a contoured inner portion 210C that curves inward toward the center of the plenum body 210 to form at a least a portion of the tapered annular slot 232'. The contoured inner portion 210C (along with the upper portion 210B) can help direct and/or accelerate air out of the plenum body 210 through the annular slot 232'.

Figure 2E:
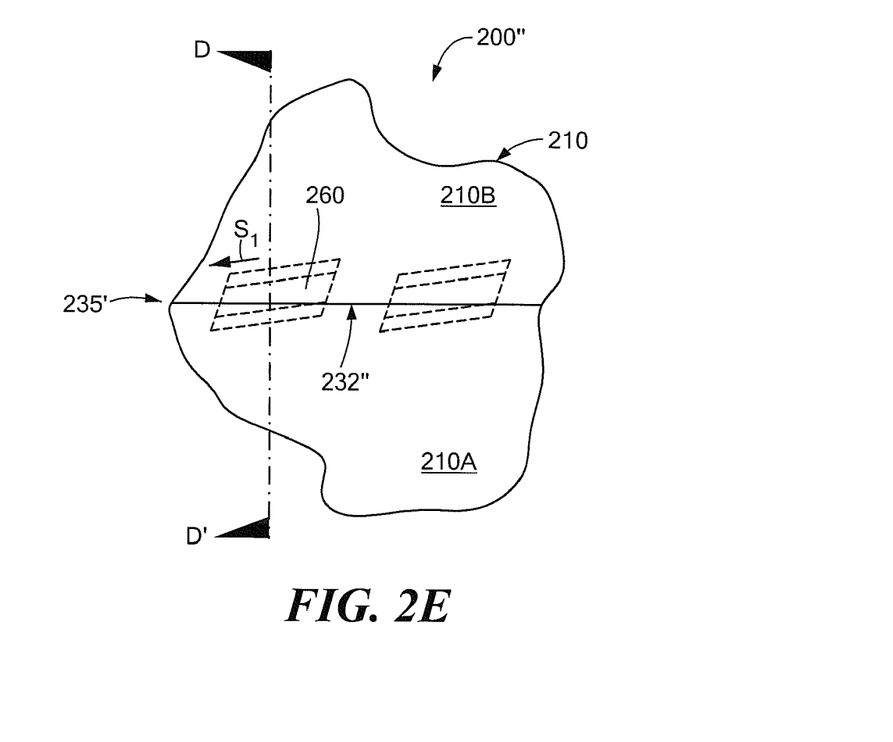
FIG. 2E is a pictorial representation of an expanded side view of foils of the torque production vehicle embodiment of FIG. 2A.

Referring now to FIG. 2E showing an expanded side view of an annular slot area 235' of a further vehicle embodiment 200'', and in which like elements of FIGS. 2A, 2B, and 2C are shown with like reference designations, foils (an example of which is designated by reference number 260) are disposed in an annular slot 232''. The foils 260 are disposed in a first sloped direction $S_1$ with respect to the base and upper plenum body portions 210A, 210B. In some embodiments, the first sloped direction $S_1$ is downward from the right side to the left side of the plane of the paper. In other embodiments, the first sloped direction $S_1$ is flipped with respect to the vertical axis of the plenum body 210, in other words, downward from the left side to the right side of the plane of the paper.

Figure 2F:
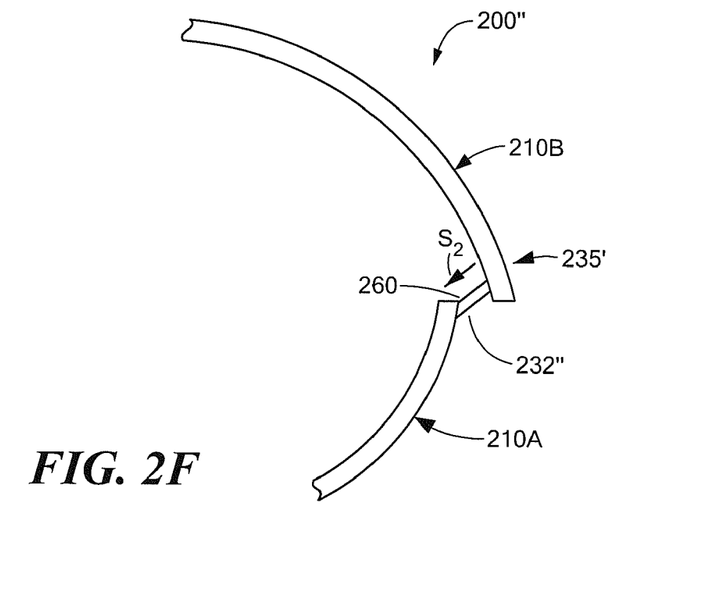
FIG. 2F is a pictorial representation of an expanded cross-sectional side view of foils disposed in an annular slot area configuration of the torque production vehicle embodiment of FIG. 2E at reference line DD'.

Referring now to FIG. 2F showing an expanded cross-sectional side view at reference line DD' of the vehicle embodiment 200'' of FIG. 2E, and in which like elements of FIGS. 2A, 2B, 2C, and 2E are shown with like reference designations, the foils 260 are disposed in a second sloped direction $S_2$ with respect to the base and upper plenum body portions 210A, 210B. In some embodiments, the second sloped direction $S_2$ is downward from the upper plenum body portion 210B to the base plenum body portion 210A. In other embodiments, the second sloped direction $S_2$ is flipped with respect to the vertical axis of the plenum body 210, in other words, downward from the from the base plenum body portion 210A to the upper plenum body portion 210B.

In some embodiments, the foils 260 are configured to provide structural support to the vehicle 200". More particularly, the foils 260 may be configured to provide structural support between the base and upper plenum body portions 210A, 210B. Advantageously, the foils 260 can be made to provide structural support to counteract relatively large forces acting to pull apart the base and upper plenum body portions 210A, 210B produced by the pressurized air and vehicle rotation. In the same or different embodiment, the foils 260 are configured to rotate to control pitch of the foils 260 to further enable and control torque production about the vehicle.

It will be understood by one of ordinary skill in the art that the radial port 230 is not limited to the embodiments described above in conjunction with FIGS. 2A-2F. For example, the radial port 230 may be formed in one of the upper portion wall 212B, the base portion wall 212A, or a combination thereof. Such configurations may provide different types of torque production about the vehicle. For example, torque forces about the upper portion of the plenum body 210B may differ from torque forces about the base portion of the plenum body 210A.

Figure 3A:
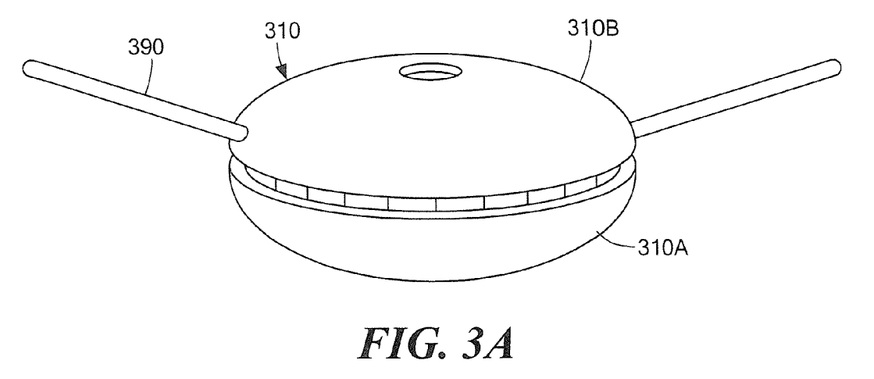
FIG. 3A is a pictorial representation of arms of a further torque production vehicle embodiment.

Referring now to FIG. 3A, in a further embodiment, an arm is a plurality of arms 390, for example, two (as shown), three, four, up to N arms. One of ordinary skill in the art will understand how to select an appropriate number of arms to use in any particular application. For example, a single arm may be used. Alternatively, two arms may be used (an embodiment of which is shown in FIG. 3A) or four arms may be used (an embodiment of which is shown in FIG. 3B).

Figure 3B:
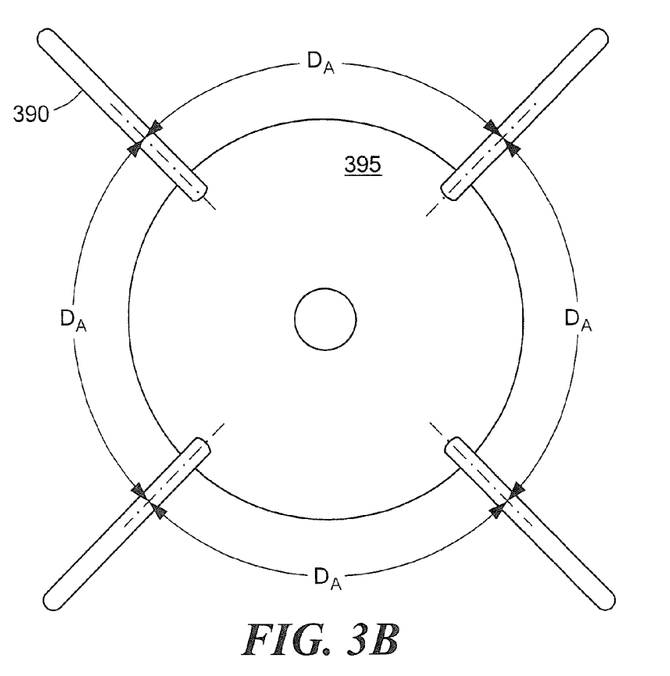
FIG. 3B is a pictorial representation of arms spaced equidistantly around a plenum body of yet another torque production vehicle embodiment.

Referring now to FIG. 3B, in a further embodiment each of the arms 390 are spaced about the plenum body 395 a distance $D_A$ from each other. It will be apparent to one of ordinary skill in the art that the arms 390 may be coupled most anywhere to the plenum body 310. For example, the arms 390 may be coupled distally to the upper plenum body portion 310B (an embodiment of which is shown in FIGS. 3A and 3B) or to the base plenum body portion 310A.

Figure 4A:
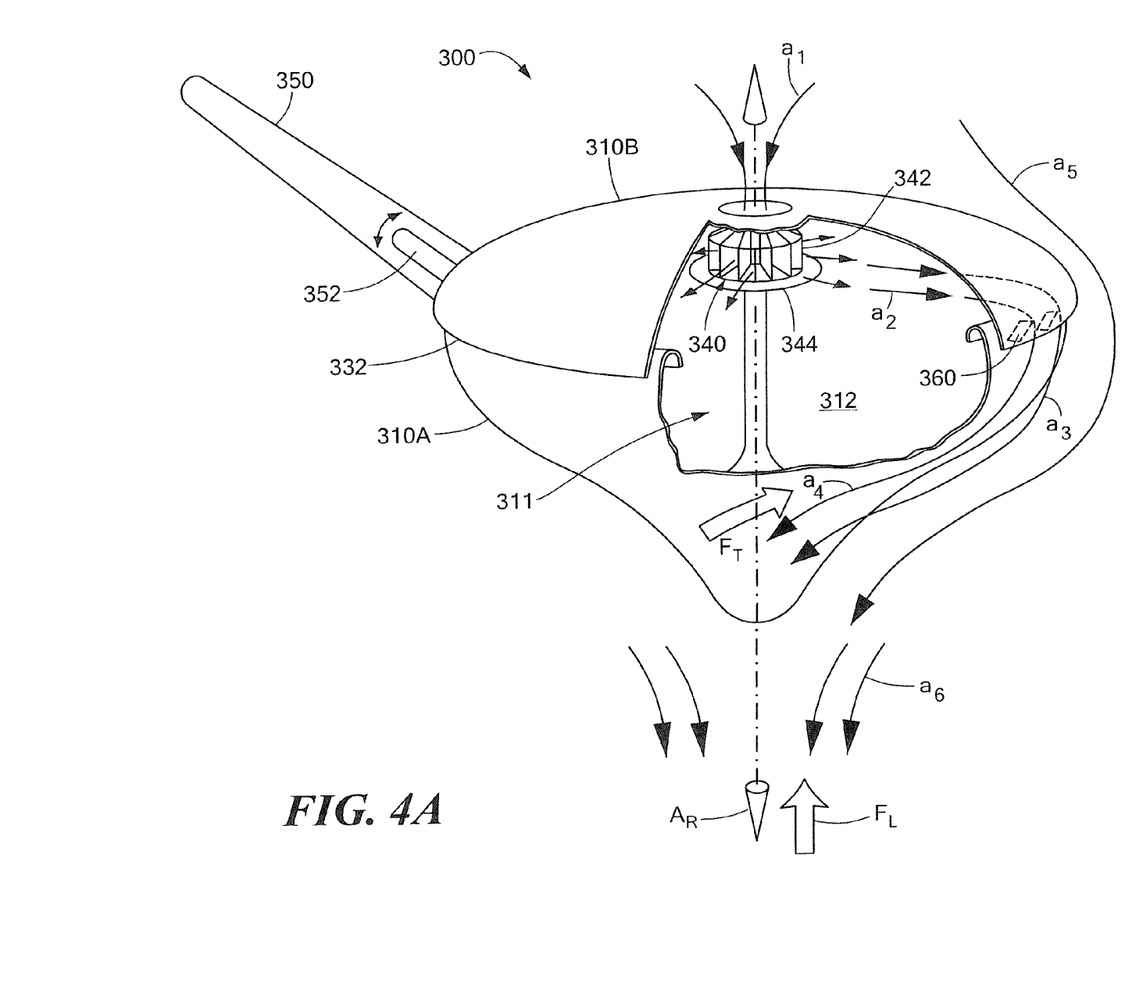
FIG. 4A is a pictorial representation of an exemplary operation of a torque production vehicle.

Referring now to FIG. 4A, an exemplary operation of a vehicle 300, as may be similar to vehicle 200 described in conjunction with FIGS. 2A, 2B, and 2C, will now be described. FIG. 4A exposes an inner portion of the plenum body 311 for illustrative purposes and to aide in explanation; however, the inner portion 312 in not meant to be limiting. An impeller 340 moves outside air $a_1$ into a plenum body 310 by drawing the air through the impeller 340. Air $a_2$ is accelerated in a radial direction out of the impeller 340. The air $a_2$ may also be spun out of the impeller 340. The accelerated air pressurizes the inner chamber 312 of the plenum body 310.

As can be seen in FIG. 4A, the impeller 340 includes foils 342 for moving the air and may further include foil 344 which acts on the air to provide a drag force to slow the spin of the air.

Air $a_2$ is distributed toward an annular slot 332 along the perimeter of the plenum body 310. As air moves out of the plenum body 310 through the annular slot 332, foils 360 disposed in the annular slot 332 spin the air $a_3$ producing a torque force $F_T$ about the vehicle 300 and causing the vehicle 300 to spin about a vertical axis $A_R$.

Figure 4B:
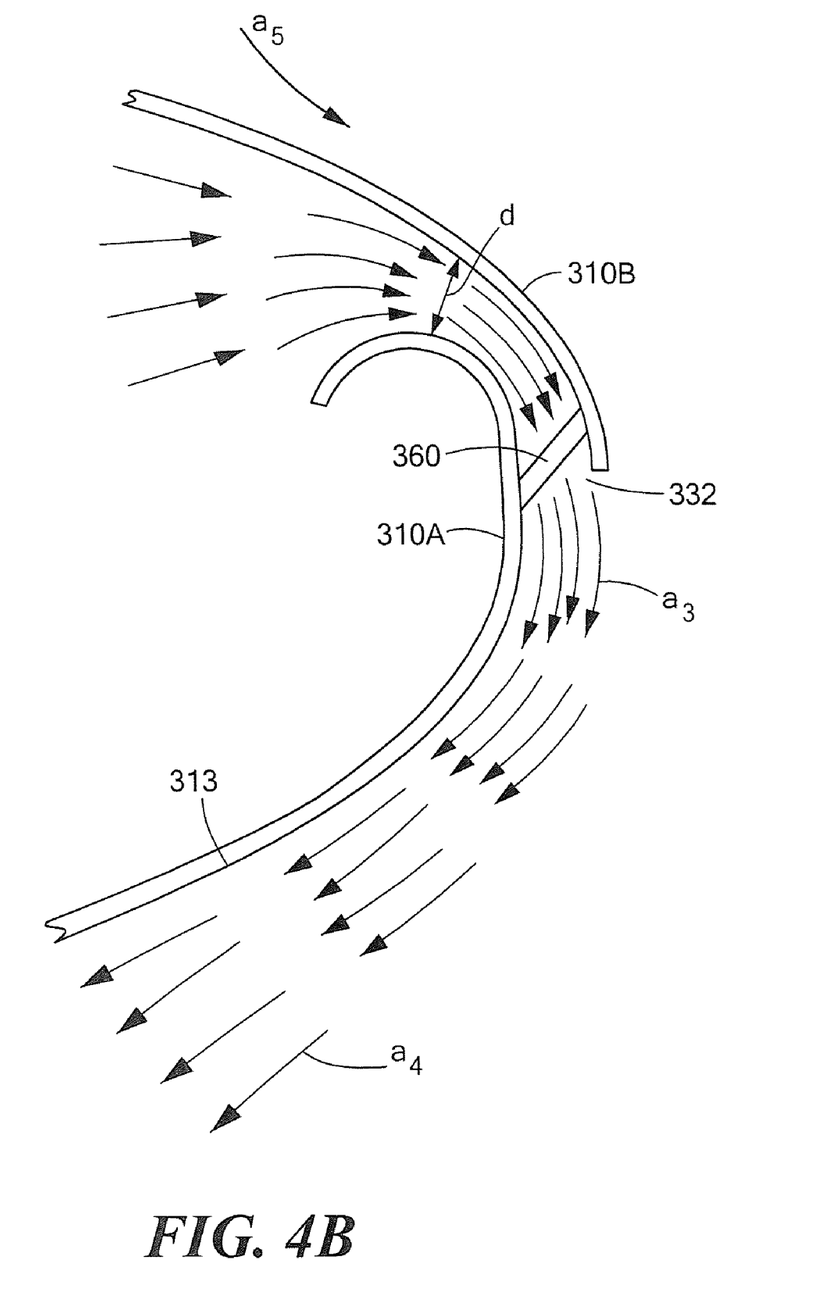
FIG. 4B is a pictorial representation of a close-up cross-sectional side view of the torque production vehicle of FIG. 4A showing air movement along an annular slot.

Referring again to FIG. 4A, and now to FIG. 4B showing an expanded cross-sectional side view of the annular slot 332 shown in FIG. 4A, more particularly, escaping air $a_3$ tends to wrap around the outer surface of the plenum body 313. As can be seen in FIG. 4B, the annular slot 332 defined by convergent diameter d formed by base and upper plenum body portions 310A, 310B, similar to the arrangement shown and described in conjunction with FIGS. 2E and 2F, may further accelerate escaping air $a_3$ as is moves past foils 360.

Escaping air $a_3$ causes air to flow into downward moving vertical air column $a_4$ which entrains external air mass $a_5$ causing a net air column flow $a_6$ from the upper portion of the plenum body 310B to the lower portion of the plenum body 310A. Downward air column flow may reduce or eliminate a so called "downwash shadow" that would otherwise be produced by the vehicle's mass and provides vertical lift $F_L$ to the vehicle 300.

Advantageously, in such operations angular momentum of the spinning impeller can be made to be substantially equal to angular momentum of the plenum body. In particular, the relatively low-mass impeller spins rapidly in a first direction (for example, clockwise) about a central vehicle axis about an inner diameter of the vehicle producing an internal angular momentum, whereas the relatively high-mass plenum body spins slowly in a second direction, opposite to the first direction (for example, counter-clockwise), about the central vehicle axis about an outer diameter of the vehicle, producing an external angular momentum. The internal and external angular momentums can be made to be substantially equal. In this way, the net angular momentum of the entire vehicle about the central vehicle axis can be minimized and/or eliminated. More particularly, any pitch or roll control applied to the vehicle can done without concern for precession since the gyroscopic forces (which are proportional to angular momentums) of the spinning impeller and plenum body cancel each other.

Directional operation and control of the vehicle 300 will now be described. Torque control is provided by a controller that affects the impeller's speed of rotation about axis $A_R$, which may be expressed in revolutions per minute (RPM). Increasing impeller RPM increases the pressure inside the plenum body 312 and flow rate of air through the plenum body 310. In forward flight the plenum body 310 produces a vertical lift $F_L$. The center of pressure on the plenum body 310 will be well forward of the center of rotation $A_R$, causing a significant vehicle pitch-up moment. To counteract this moment, the arm 350 can be controlled to produce high lift while sweeping past the trailing sector of the rotating plenum body 310. In particular, the arm 350 may be moved once per revolution (e.g., when the arm is in the trailing sector of the rotating plenum body 310) to produce high lift. This lift production by the arm 350 induces a downwash aft of the plenum body 310 that induces a circulation about plenum body 310 that should create lift even when the plenum body 310 is tipped slightly forward. One method for moving the arm 350 is to rotate the arm 350 about a rotating shaft 352 configured to allow the arm 350 to pitch.

Figure 5:
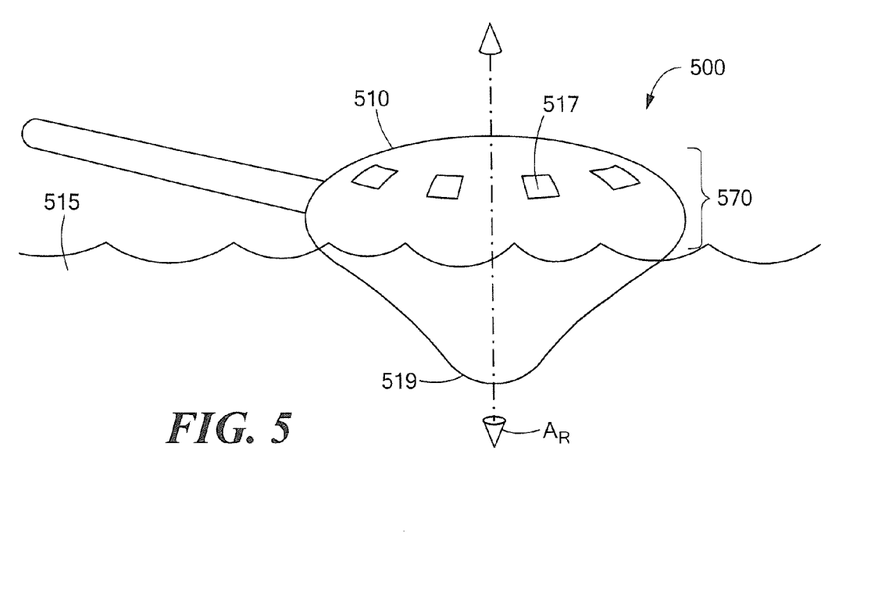
FIG. 5 is a pictorial representation of a torque production vehicle embodiment configured to float about a body of water.

Referring now to FIG. 5, in further embodiments, a vehicle 500 is configured to float about a body of water 515. The vehicle 500 includes an axially symmetric plenum body 510 defined by cone-shaped cross-sectional area. A tip 519 of the cone-shaped cross-sectional area faces the body of water and is configured for efficient vehicle landing and take-off proximate to the surface of the body of water 515. The vehicle 500 rotates about a central axis $A_R$.

In some vehicle embodiments, at least a portion 570 of the plenum body 510 floats above the surface of the body of water 515. Advantageously, the above water portion 570 of the plenum body 510 can be equipped with solar cells 517 to absorb solar energy harnessed to recharge energy cells used to power the vehicle 500. In some applications, the vehicle 500 includes electronics that signal when the vehicle 500 has recharged and is ready for deployment.

Figure 5A:
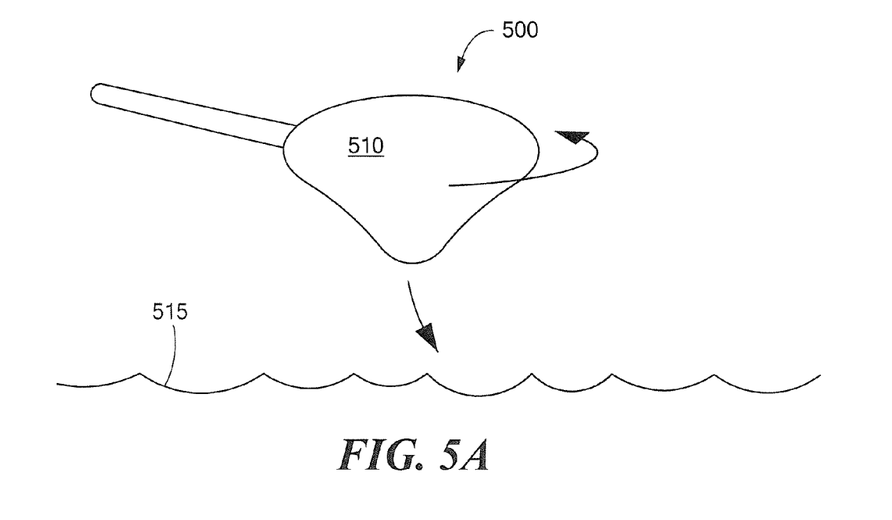
FIGS. 5A, 5B, 5C, 5D, 5E, 5F, 5G, 5H, and 5I are pictorial representations of exemplary operations of the floating torque production vehicle embodiment of FIG. 5.
Figure 5B:
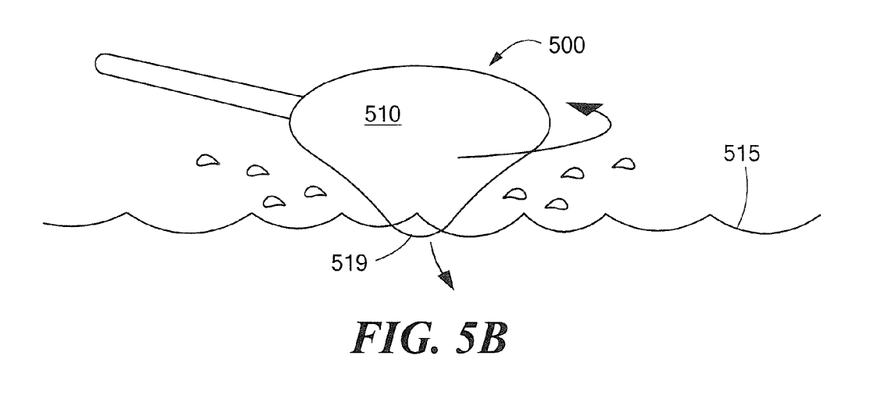

Referring now to FIG. 5A-5H, an exemplary operation of the vehicle 500 in a water environment will now be described. In some embodiments, the vehicle 500 includes a controller to control vehicle rotation for landing and take-off. In FIG. 5A, as the all-rotating hovering vehicle 500 approaches a body of water 515, the controller decreases vehicle rotation rate (e.g., by decreasing engine power to the impeller to decrease impeller rotation speed) to prepare for landing on the body of water 515. In FIG. 5B, as the vehicle hovers proximate to the body of water 515, a tip 519 of the vehicle 500 facing the body of water 515 begins to penetrate the surface of the body of water 515 and the controller further decreases vehicle rotation rate.

Figure 5C:
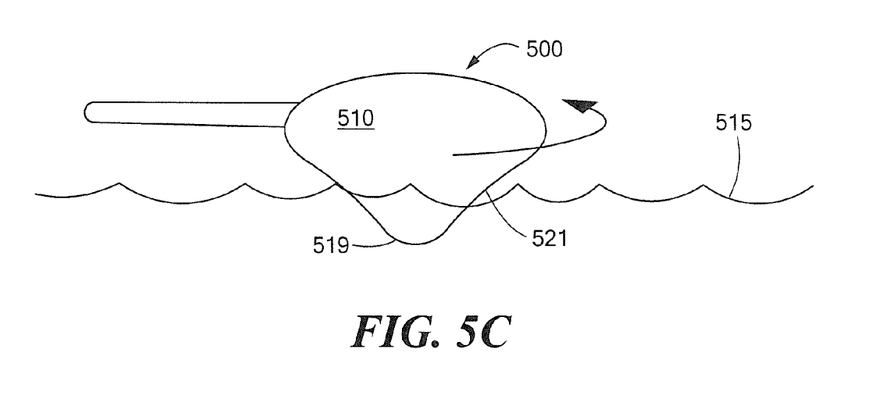

In FIG. 5C, as the tip 519 declines into the body of water 515, the controller further decreases vehicle rotation rate. In this way, the tip 519 provides stability to the vehicle 500 and as a symmetrical wide portion 521 of the base of the plenum body 510 begins to contact the water, the plenum body 510 begins to displace the water, enabling the vehicle 500 to float proximate the surface of the body of water 515. Furthermore, the water in contact with the plenum body 510 tends to produces a drag force acting against vehicle rotation, which may further decrease the vehicle rotation rate.

Figure 5D:
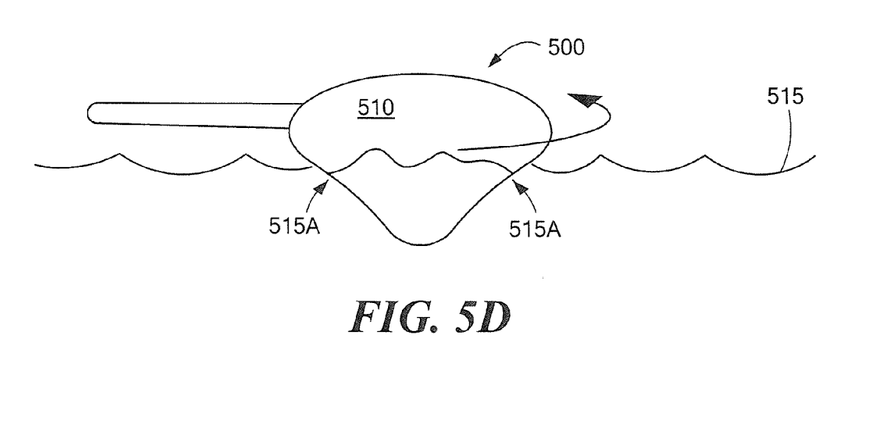
Figure 5E:
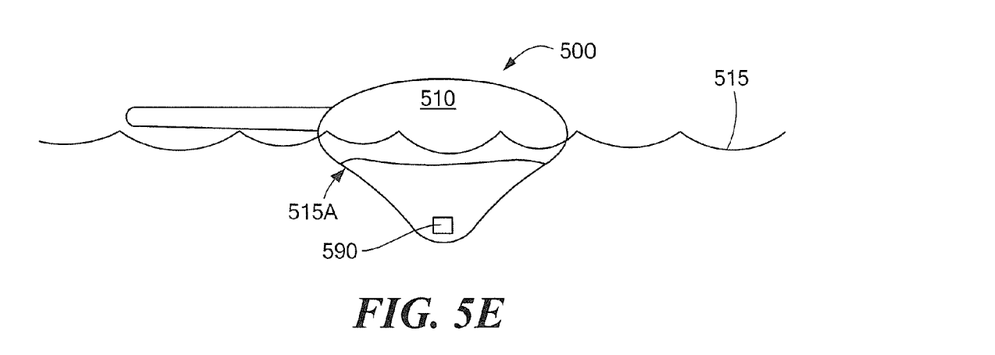

In FIG. 5D, the controller further decrease vehicle rotation rate and the air pressure inside the plenum body 510 decreases, tending to cause water 515A to enter the plenum body 510 through a radial port. In FIG. 5E, vehicle rotation substantially ceases (i.e., the vehicle comes to rest proximate to the surface of the body of water 515) and the plenum body 510 continues to fill with water until at least a portion of the plenum body 510 contains water. The water inside the plenum body 510 adds mass to the vehicle 500 for ballast control and tends to stabilize the floating vehicle 500. For example, the ballast control may resist wave forces on the vehicle 500.

Referring again to FIG. 5E, in further embodiments, the tip 519 of the vehicle 500 includes a sensor device 590. As by way of a non-limiting example, the sensor device 590 may include a sonar device. In some applications, the sonar device can be used to sense, detect, and/or monitor underwater objects, such as enemy vehicles or underwater mines. It will be understood by one of ordinary skill in the art that the vehicle may be used for other applications, such as industry applications for exploration and/or salvaging of sunken objects.

In other embodiments, the vehicle may be configured to operate entirely beneath the surface of the body of water and may be configured to move about beneath the surface of the body of water. In still other embodiments, the plenum body may be configured to flood at least partially with water such that the vehicle sinks to a bottom of the body of water. Advantageously, such configurations may be beneficial for stealth operations in which it is desirable or necessary to hide the vehicle from hostile forces.

Figure 5F:
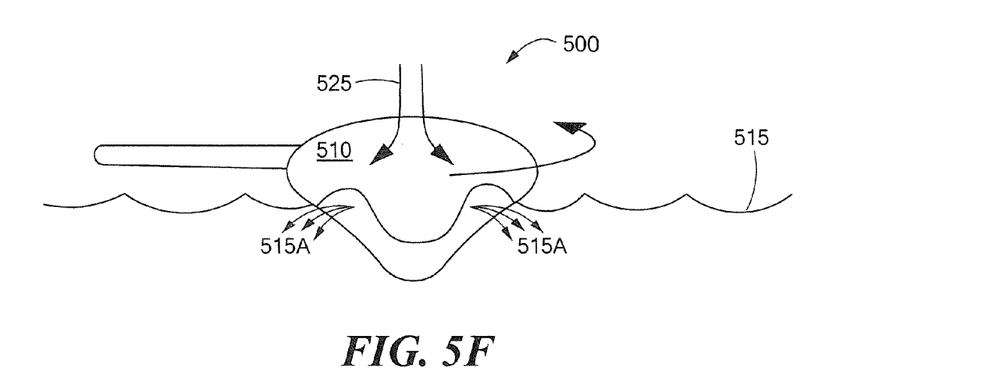
Figure 5G:
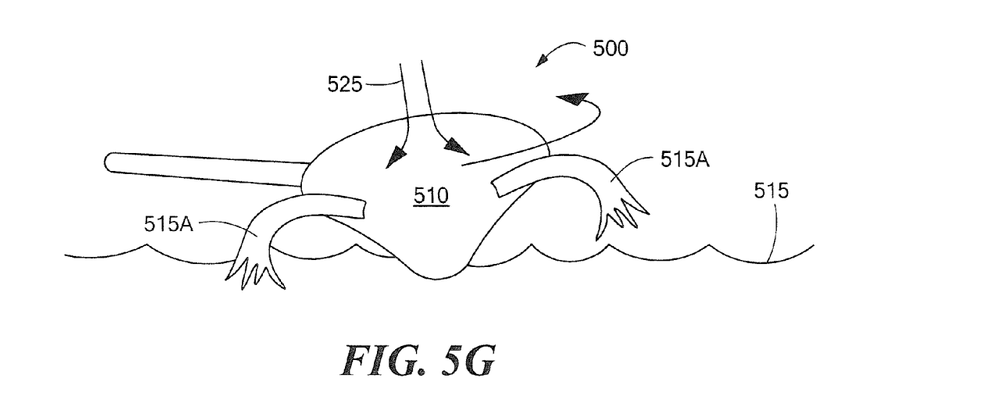
Figure 5H:
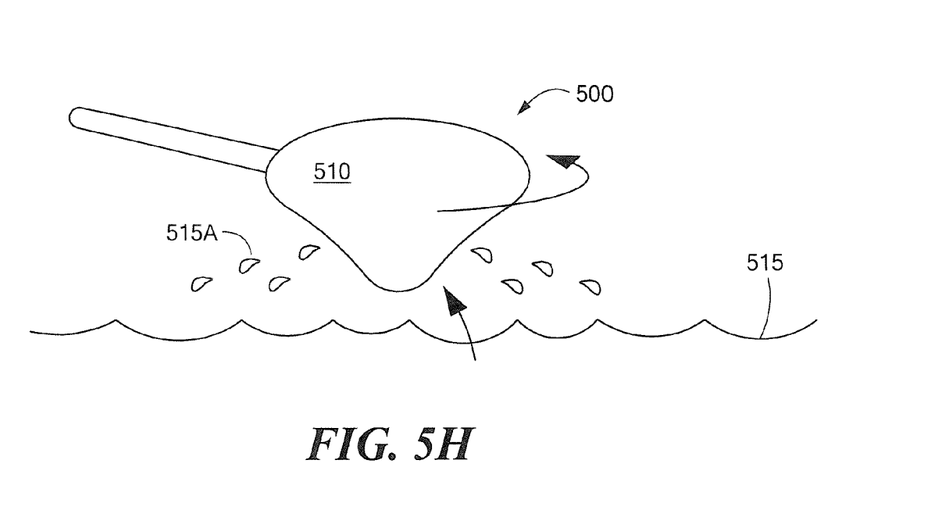
Figure 5I:
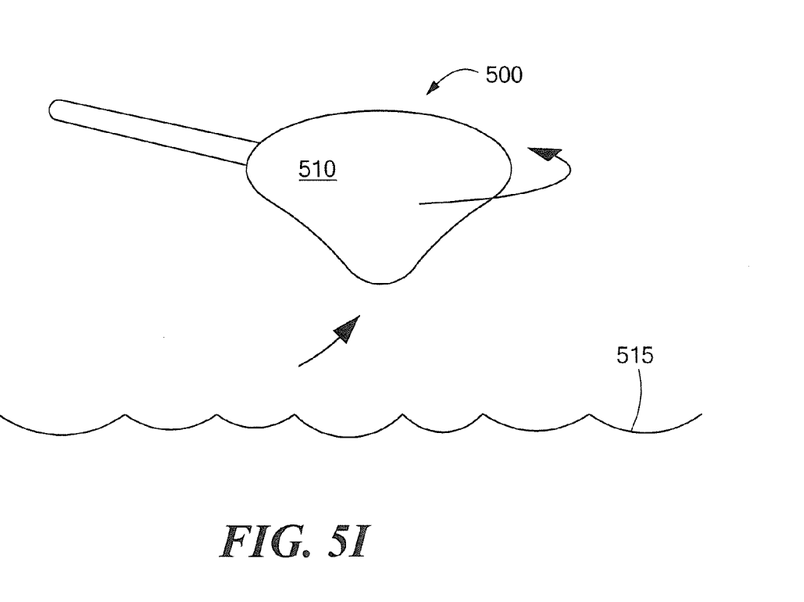

Referring now to FIG. 5F, the controller initiates vehicle rotation to enable vehicle take-off from the body of water 515. The plenum body 510 begins to pressurize as the impeller moves outside air 525 into the plenum body 510 via a central port. In FIG. 5G, the pressurized air tends to force the water 515A inside the plenum body 510 out through the radial port. In FIG. 5H, the controller further increases vehicle rotation rate which provides vehicle lift and forces the remaining water 515A out of the plenum body 510. In FIG. 5I, the vehicle 500 has completed take-off from the body of water 515 and is ready for airborne operations.

Figure 6:
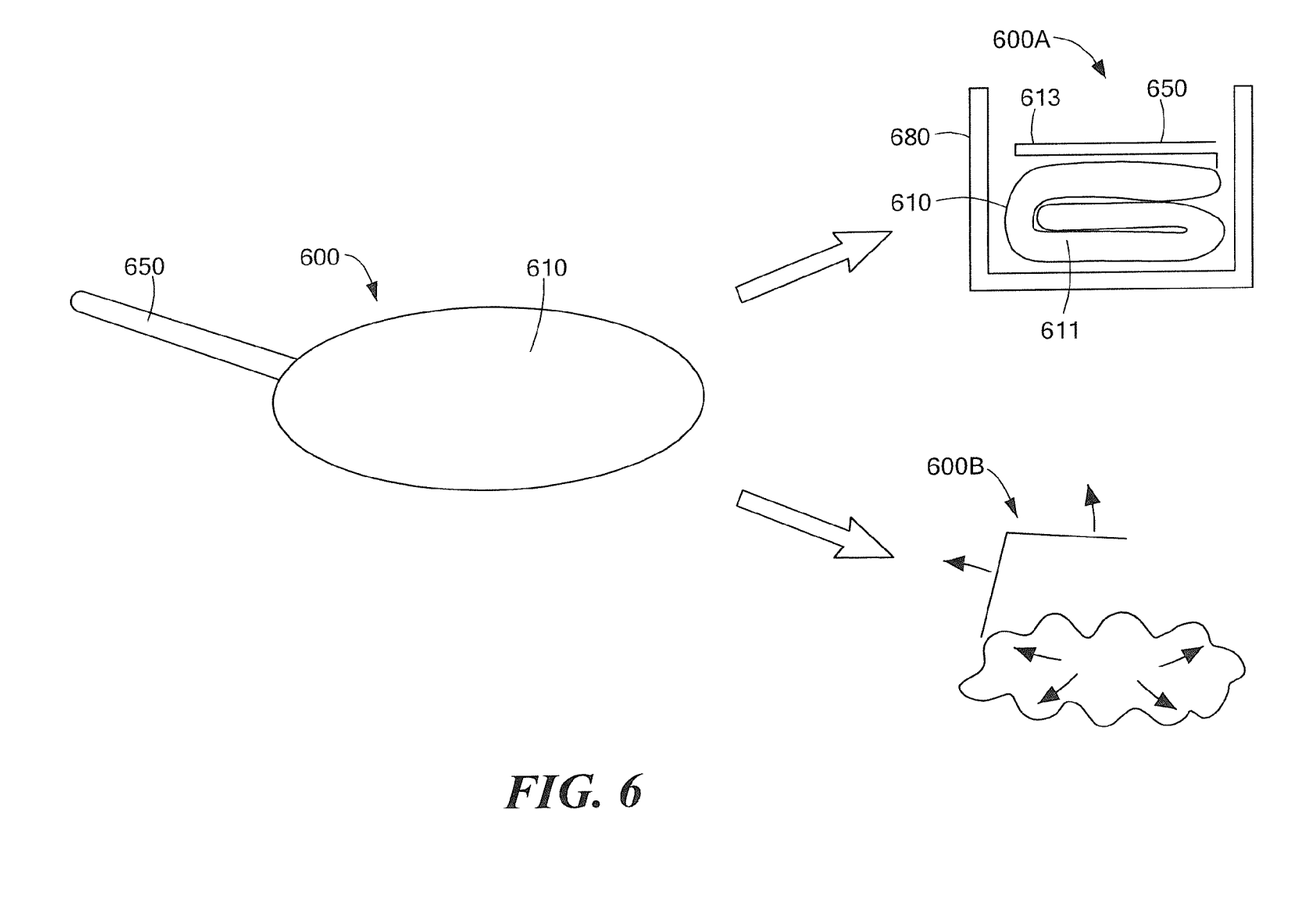
FIG. 6 is a pictorial representation of another torque production vehicle embodiment configured to be collapsible and expandable.

Referring now to FIG. 6, in further embodiments, a vehicle 600 configured for rapid deployment includes a flexible plenum body 610 that is collapsible for storage 600A and expandable for deployment 600B. In one exemplary application, a flexible plenum body embodiment 610 is folded into sections (generally denoted by reference numeral 611) for storage in a storage compartment 680. In further embodiments, the vehicle 600 includes an arm 650 that is also collapsible. As by way of a non-limiting example, the arm 650 may be folded along hinges 613 to enable storage in the storage compartment 680.

Figure 6A:
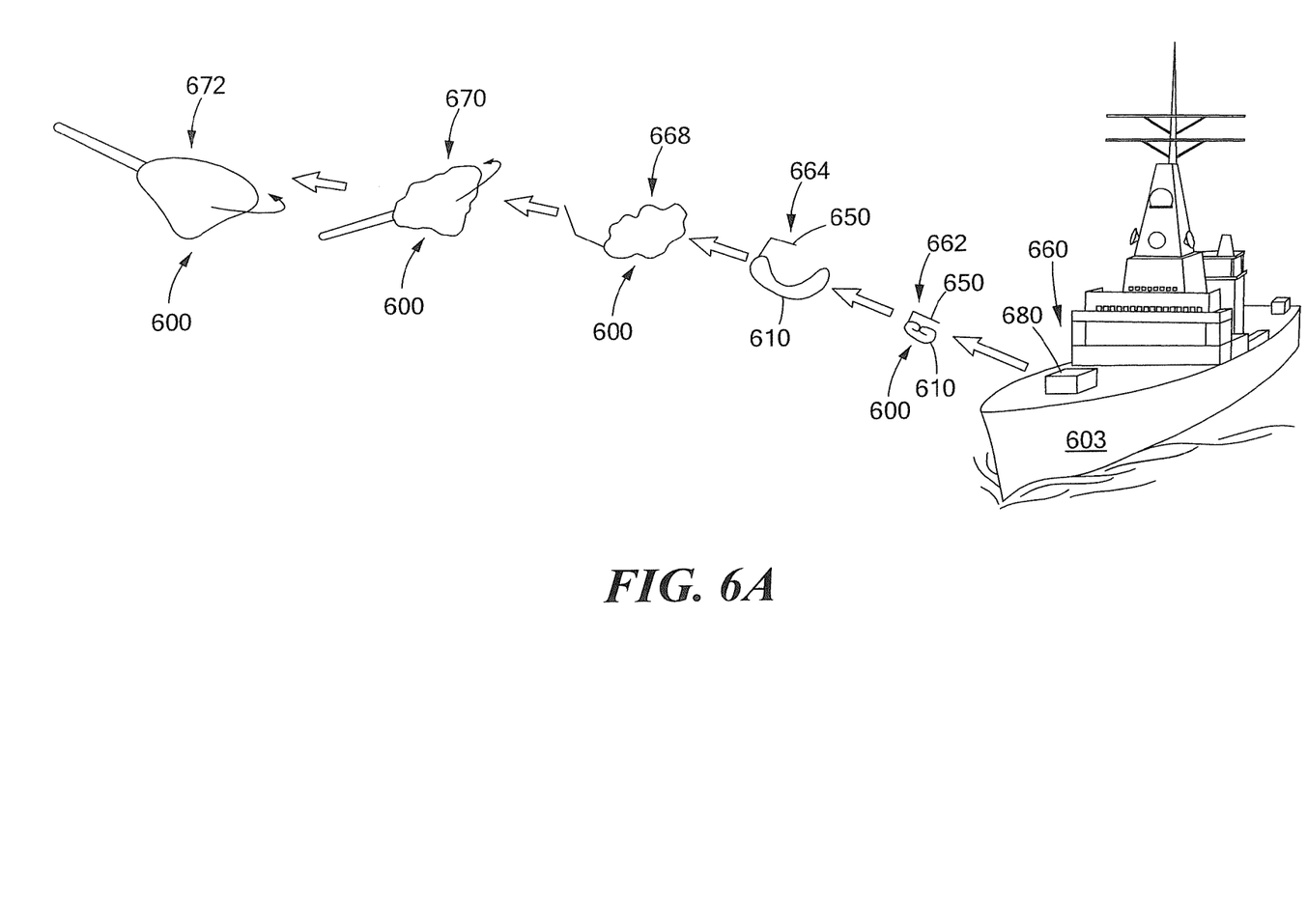
FIG. 6A is a pictorial representation of exemplary operations of the expandable/collapsible torque production vehicle embodiment of FIG. 6.

Referring now to FIG. 6A, various stages 660, 662, 664, 668, 670, 672 of an exemplary operation of the rapid deployment vehicle 600 is shown. At stage 660, the vehicle 600 is propelled out of a storage compartment 680 of a transport vehicle 603. In this exemplary application, the transport vehicle 603 is a marine vessel; however, one of ordinary skill in the art will readily appreciate that the vehicle 600 may be deployed in other environments from other vehicles, such as in a land-based environment from a truck transport vehicle.

Various methods may be used to propel the vehicle 600 out of the storage compartment 680. As by way of a non-limited example, small charges may be used to launch the vehicle 600 into the air. The charges may be triggered via communications from a command control station to a chip that fires the charges. In still other examples, rockets may be used to propel the vehicle 600 into the air. In still other examples, the vehicle 600 may be released from the launch vessel 603 and may automatically inflate with air.

At stages 662 and 664, the vehicle 600 begins to expand with air. In particular, the flexible plenum body 610 begins to fill with air causing the plenum body to expand. The arm 650 may also expand and unfold outward. At stage 668, the vehicle 600 is nearly fully expanded and at stage 670, as the vehicle 600 continues to move away from the launch vessel 603, the vehicle is ready for operation. At one of the stages, the vehicle begins to rotate to enable self-propelled flight.

In still a further embodiment, the vehicle 600 may be configured to collapse for retrieval in the field. For example, upon landing, the vehicle 600 may cease rotation causing the flexible plenum body to depressurize and collapse.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A vehicle comprising:
    a plenum body having a wall with a central port formed within the wall and a radial port formed within the wall between an upper portion of the plenum body and a base portion of the plenum body;
    an impeller disposed within the plenum body to move air through the central port;
    an engine coupled to the impeller to rotate the impeller about an axis;
    at least one arm attached to an outer surface of the wall of the plenum body and extending laterally beyond the outer surface of the wall of the plenum body; and
    a plurality of foils disposed in the radial port between the upper portion plenum body wall and the base portion plenum body wall to direct air about the plenum body to provide a torque force about the plenum body.

2. The vehicle of claim 1, wherein the base portion of the plenum body is defined by a conical-shaped cross-sectional area forming an elongated tip at one end of the plenum body opposing the upper portion of the plenum body.

3. The vehicle of claim 2, wherein the plenum body is defined by a vertical extent and a horizontal extent longer than the vertical extent and the conical-shaped cross-sectional area is symmetric about a central radial axis.

4. The vehicle of claim 2, wherein, based on the torque force, the plenum body rotates about a central axis and the plenum body is longitudinally coincident with the central axis.

5. The vehicle of claim 1, wherein the
radial port is formed between a lower radial extent of the upper portion of the plenum body and an upper radial extent of the base portion of the plenum body.

6. The vehicle of claim 1, wherein the radial port forms a downward facing annular slot between the base portion and the upper portion, the annular slot having a diameter which converges from an inner portion of the annular slot to an outer portion of the annular slot.

7. The vehicle of claim 6, wherein the annular slot is formed along the entire area around the plenum body.

8. The vehicle of claim 1, wherein the inner surface of the plenum body wall is smooth to substantially reduce a coefficient of friction of air moving along the inner surface of the plenum body.

9. The vehicle of claim 1, wherein the plenum body is comprised of a flexible material.

10. The vehicle of claim 9, wherein the flexible material is expandable and collapsible.

11. The vehicle of claim 1, wherein the impeller is a centrifugal impeller.

12. The vehicle of claim 1, wherein the impeller is an axial impeller.

13. The vehicle of claim 1, wherein the impeller is a mixed-flow impeller.

14. The vehicle of claim 1, wherein the arm is a lift arm configured to provide directional control including at least one of: vertical movement and horizontal movement of the vehicle.

15. The vehicle of claim 1, wherein the arm is coupled distally to the plenum body.

16. The vehicle of claim 1, wherein the arm is a plurality of arms.

17. The vehicle of claim 16, wherein the arms are evenly spaced about the plenum body.

18. The vehicle of claim 1, further comprising a shaft to couple the impeller and the engine.

19. The vehicle of claim 1, further comprising a controller.

20. A method of torque production comprising:
providing a vehicle comprising:
a plenum body having a wall with a central port formed within the wall and a radial port formed within the wall between an upper portion of the plenum body and a base portion of the plenum body;
moving air from an impeller disposed within the plenum body through the central port; and
moving air through a plurality of foils disposed in the radial port between the upper portion and the base portion of the plenum body wall to direct air about the plenum body providing a torque force to rovide directional control of the vehicle, including moving air about at least one arm attached to an outer surface of the wall of the plenum body and extending laterally beyond the plenum body wall.

21. The method of claim 20, wherein the base portion of the plenum body is defined by a conical-shaped cross-sectional area forming an elongated tip at one end of the plenum body opposing the upper portion of the plenum body.

22. The method of claim 21, wherein the plenum body is defined by a vertical extent and a horizontal extent longer than the vertical extent and the conical-shaped cross-sectional area is symmetric about a central radial axis.

23. The method of claim 21, further comprising:
based on the torque force, rotating the plenum body about a central axis, the base portion of the plenum body longitudinally coincident with the central axis.

24. The method of claim 20, wherein the
upper portion of the plenum body vertically opposes the base portion of the plenum body, the radial port formed between a lower radial extent of the upper portion of the plenum body and an upper radial extent of the base portion of the plenum body.

25. The method of claim 20, wherein the radial port forms a downward facing annular slot between the base portion and the upper portion, the annular slot having a diameter which converges from an inner portion of the annular slot to an outer portion of the annular slot.

26. The method of claim 25, wherein the annular slot is formed along the entire area around the plenum body.

27. The method of claim 20, wherein the inner surface of the plenum body wall is smooth to substantially reduce a coefficient of friction of air moving along the inner surface of the plenum body.

28. The method of claim 20, wherein the plenum body is comprised of a flexible material.

29. The method of claim 28, wherein the flexible material is expandable and collapsible.

30. The method of claim 20, wherein the impeller is a centrifugal impeller.

31. The method of claim 20, wherein the impeller is a propeller.

32. The method of claim 20, wherein the arm is a lift arm configured to provide directional control including at least one of: vertical movement and horizontal movement of the vehicle.

33. The method of claim 20, wherein the arm is coupled distally to the plenum body.

34. The method of claim 20, wherein the arm is a plurality of arms.

35. The method of claim 34, wherein the arms are evenly spaced about the plenum body.

36. The method of claim 20, wherein the vehicle further comprises a shaft to couple the impeller and an engine to drive the impeller.

37. The method of claim 20, wherein the vehicle further comprises a controller.

38. The vehicle of claim 1, wherein at least one of the plurality of foils is sloped in at least one of: a first direction extending radially from the base portion to the upper portion of the plenum body or a second direction orthogonal to the first direction.

39. The vehicle of claim 4, wherein based on the torque force, the entire vehicle rotates about the central axis.

40. The method of claim 20, wherein moving air through a plurality of foils further comprises:
moving air across at least one of the foils sloped in at least one of: a first direction extending radially from the base portion to the upper portion of the plenum body or a second direction orthogonal to the first direction.

41. The method of claim 23, further comprising based on the torque force, rotating the entire vehicle about the central axis.

* * * * *